Patented Apr. 19, 1949

2,467,976

UNITED STATES PATENT OFFICE

2,467,976

METHOD FOR INCREASING THE VISCOSITY OF LIQUID POLYMERIC DIMETHYL SILICONE

James Franklin Hyde, Corning, N. Y., assignor to Corning Glass Works, Corning, N. Y., a corporation of New York No Drawing. Application March 30, 1943, Serial No. 481,155

1 Claim. (Cl. 260—448.2)

This invention relates to new compositions of matter, their preparation and uses and, more particularly, to organo-siloxanes and methods of preparing them.

This application is a continuation-in-part of my copending applications Serial No. 318,373, filed February 10, 1940, Serial No. 353,302, filed August 19, 1940, and Serial No. 432,529, filed February 26, 1942, all assigned the assignee of the present invention. These applications are now Patents Nos. 2,386,466; 2,371,050 and 2,438,478, respectively.

The present invention is concerned with a method of further polymerizing organo-silicon oxide polymers and with the products derived therefrom. Organo-siloxanes are compounds which contain organic radicals attached to silicon through a carbon atom and whose silicon atoms are joined to other silicon atoms by oxygen atoms, thus Si—O—Si. They may be prepared by the hydrolysis of hydrolyzable organo-silicanes and condensation of the hydrolysis products. Furthermore, hydrolysis of a mixture of different hydrolyzable organo-silicanes and co-condensation of the hydrolysis products produces organo-siloxanes which are within the scope of my invention. In the latter case, a hydrolyzable silicane which contains no organic radicals attached to silicon through a carbon atom, such as silicon tetrachloride or ethyl orthosilicate, may be included along with the hydrolyzable organo-silicanes. By hydrolyzable organo-silicanes I mean derivatives of $SiH_4$ which contain readily hydrolyzable radicals such as hydrogen, halogens, amino groups, alkoxy, aroxy and acyloxy radicals, etc., the remaining valences of the silicon atoms being satisfied by organic radicals that are joined to the silicon atoms through carbon atoms such as alkyl, substituted alkyl, aryl, substituted aryl radicals, etc.

Hydrolysis of the above silicanes or mixtures thereof is generally concurrently accompanied by condensation to a greater or less degree depending upon the conditions of hydrolysis and the particular silicanes involved. As a result of the hydrolysis and concurrent condensation, organo-silicon oxide polymers or organo-siloxanes are produced which are partially or completely condensed and which have on the average up to and including three organic radicals attached to each silicon atom. The polymers so obtained vary in character, some being oily liquids, others being crystalline solids or gels. They also vary in the ease with which they may be further polymerized by heat since they differ in the number of active functional groups retained as a result of incomplete hydrolysis and condensation. Those which are only partially condensed may be converted to higher polymers and even to solids by heat alone or even by standing at room temperature by virtue of the completion of condensation. On the other hand, those organo-siloxanes which approach complete condensation are extremely resistant to further polymerization by heat alone. These substantially completely condensed polymers are not limited to those which are of high molecular weight but may be polymers of low molecular weight as well. For example, the condensed hydrolysis products of the di-organo-silicanes are essentially completely condensed even in the low polymeric stages and exist generally in the trimeric form with polymers as high as the hexamer being reported in only rare instances. Since the higher polymers of these organo-silicon oxide compounds, and particularly the higher polymers of the substantially completely condensed compounds, have been found to possess properties which adapt them to many industrial applications as will be described below, it is highly desirable to provide a method of further polymerizing the organo-silicon oxide polymers to higher polymeric compositions, that is, to increase their average molecular weight.

The primary object of this invention is to provide a method of polymerizing the hydrolysis products of hydrolyzable organo-silicanes or mixtures thereof.

Another object of my invention is to provide a method of further polymerizing an organo-silicon oxide polymer having on the average less than three organic radicals attached through carbon atoms to each silicon atom.

Another object of my invention is to provide a method of further polymerizing a substantially completely condensed liquid hydrolysis product of a silicane of the type $R_2SiX_2$, where each R is an organic radical which is joined to the silicon atom through a carbon atom and each X is a hydrolyzable atom or group.

Still another object of the present invention is to provide a method of polymerizing a substantially completely condensed liquid hydrolysis product of a mixture comprising essentially a di-organo-substituted silicane to a polymeric composition which is substantially free of polymers having less than seven silicon atoms per molecule.

Another object of my invention is to provide a method of polymerizing to a heat convertible state a liquid organo-silicon oxide polymer having on the average less than three organic radicals attached through carbon atoms to each silicon atom.

A further object of my invention is to provide a method of polymerizing to an infusible resinous solid a liquid organo-silicon oxide polymer having on the average less than three organic radicals attached through carbon atoms to each silicon atom.

Another object of my invention is to prepare organo-silicon oxide polymers of high average molecular weight which are heat convertible and soluble in organic solvents.

A still further object of my invention is to prepare organo-silicon oxide polymers of high average molecular weight which are infusible resinous solids.

In accordance with my invention, I have provided a method of preparing an extremely useful polymeric composition from the hydrolysis product of a hydrolyzable organo-silicane or of a mixture of hydrolyzable silicanes which comprises maintaining an acid catalyst in intimate and continuous contact with the hydrolysis product under polymerizing conditions until a polymeric composition having the properties desired is obtained. If desired, the acid catalyst may be added during the initial hydrolysis and condensation of the silicane or mixture of silicanes. However, it is important, especially in the case of the liquid hydrolysis products which are substantially completely condensed, that the acid catalyst be maintained in intimate and continuous contact with the treated polymer until the desired higher polymer is obtained; for I have found that an appreciable increase in average molecular weight does not occur until the poymer has been so treated for some time. After this induction period, the viscosity and average molecular weight of the treated material rises rapidly until a stage of polymerization is reached where the acid catalyst is no longer necessary to continue the polymerization but heat alone in the presence of air is sufficient to convert the polymer to an infusible resinous solid. Those organo-siloxanes which are initially only partially condensed, of course, do polymerize by heat alone but I have found that treatment in accordance with my invention not only increases the rate of polymerization but produces flexible resinous solids instead of the mechanically weak gels ordinarily obtained by heat alone. In carrying out my method, I prefer to use as acid catalysts acids of the so-called strong type i. e. the hydrohalic acids, sulphuric acid, phosphoric acid, oxalic acid, etc. I have also found that the addition of water in the form of steam during the polymerization process aids in speeding up the polymerization. The particular concentration and quantity of acid employed and the optimum temperature for carrying out the polymerization are conditions which vary with the organo-siloxane being treated and also with the type of polymer desired as will be readily apparent from the examples given below. However, I prefer to carry out the polymerization at a temperature within the range from about 100° C. to about 250° C.

In general, any liquid organo-silicon oxide polymer having on the average less than three organic radicals attached through a carbon atom to each silicon atom may be polymerized by my method; that is, treatment in accordance with my method will result in an increase in average molecular weight. My method is not generally applicable to those polymers having three organic radicals attached to each silicon, that is, the dimeric ethers, since the only way the latter can polymerize is by removal of groups. In my co-pending application Serial Number 318,373 filed February 10, 1940, of which the present application is a continuation-in-part, I showed that the hydrolysis products of aryl silicanes could be polymerized to high polymers by treatment with aqueous hydrochloric acid at elevated temperatures. It was pointed out in that application that such polymerization was probably accomplished by the removal of the aryl groups and linking together of lower polymeric units to form higher polymers. I have since discovered that further polymerization of the organo-siloxanes is not limited to the aryl siloxanes but applies equally well to all organo-siloxanes. However, while polymerization in the case of aryl siloxanes may result upon the hydrolyzing of the aryl groups themselves, it is believed that a more fundamental phenomenon is involved which applies to all organo-siloxanes, namely, that the Si—O—Si bonds present in these products will rupture and rearrange on continued exposure to acid at elevated temperatures so that higher polymeric compositions may be formed even from polymers which contain few, if any, functional groups. Failure on the part of early workers in the field to appreciate the effect of acid upon the extremely stable Si—O—Si bond and the fact that any acid produced in the hydrolysis of the organo-silicon halides was speedily driven off in the gaseous form upon the application of heat before its effect could be felt probably accounts for the failure to discover that the hydrolysis products could be polymerized to materials of high molecular weight by acids.

The high polymers produced in accordance with my invention have been found to be particularly well adapted to be employed as protective coatings, especially in the field of electrical insulation. Extremely viscous fluids whose final viscosity can be controlled by the conditions of acid treatment are readily prepared which, when applied as impregnants to glass insulating tape or directly to metallic conductors and upon being heated, set to adherent and infusible coatings having varying degrees of toughness and flexibility depending also upon the particular conditions of acid treatment as well as upon the substituents present in the polymer. These coatings are heat resistant, imprevious to moisture and electrically non-conducting.

For a better understanding of my invention reference should be had to the following examples.

*Example 1*

Thirty grams of phenyl ethyl silicon dichloride were dissolved in 100 cc. of ethyl ether and then added dropwise to excess water at room temperature. The resulting mixture was allowed to stand for several days. The ether and water layers were then separated. The ether layer was dried at room temperature under a vacuum to constant weight. An oily liquid was produced which analysis showed to be the completely dehydrated cyclic trimer of phenyl ethyl silicone. The latter was heated at about 170°–180° C. while at the same time aqueous hydrochloric acid was added dropwise. The liquid became increasingly viscous. Continued heating at about 170°–180° C. with continued addition of hydrochloric acid after several hours brought the material to a sticky, viscous state, in which state it was soluble in toluene and other organic solvents. This material was found to have an average molecular weight of 1310. This corresponds closely to a polymer having 12 silicon atoms per molecule. Further heating at a somewhat higher temperature converted it to a flexible non-tacky resinous substance which was infusible and insoluble. Substantially the same kind of product was obtained when phenyl ethyl silicone was treated in like manner with .2% by weight of sulphuric acid in the neighborhood of 200° C.

Example 2

A sample of trimeric phenyl ethyl silicone was heated to about 180° C. A quantity of 85% phosphoric acid equal to about 1.5% by weight of the silicone was added with stirring to the silicone. The mixture was kept at 180°–190° C. until the viscosity of a 50% solution of the product in toluene at 25° C. reached 50 centipoises. The phosphoric acid was removed by washing with excess calcium hydroxide, leaving a toluene solution which served as an excellent coating composition for glass fibre tape.

Example 3

A mixture of dimethyldiethoxysilicane and 85% sulfuric acid in the ratio of 2:1 by volume was stirred for a few minutes. An oily liquid was produced. This liquid was heated between 100° C. and 200° C. for about ten hours. The resulting polymer was extremely viscous and soluble in benzene. A solution of the polymer in benzene was applied to some glass fibre tape which was then baked for 20 hours at 130° C., for 48 hours at 250° C., and for 100 hours at 300° C. After a few hours of the baking an adherent, non-tacky and flexible coating was produced which retained its non-tackiness and flexibility throughout the entire baking process.

Example 4

A mixture of 10 cc. of monobutyltriethoxysilicane, 10 cc. of 95% ethyl alcohol and 1.4 cc. of 10 N sulfuric acid was held at 30° C. for 21 hours. 3 cc. of carbitol acetate were then added to the mixture in order to facilitate the removal of alcohol and water in the subsequent desiccation. The entire mixture was transferred to an aluminum dish in a desiccator where it was maintained under vacuum for 24 hours. The alcohol and water were thereby removed. The aluminum dish and its contents were then placed in an oven at 100° C. for 3 days. The temperature was raised to 150° C. and held there for a day; at 170° C. for two days; and at 300° C. for a day. The product was an insoluble and infusible horny resin.

Example 5

A sample of phenyl methyl silicone (prepared by the hydrolysis of phenyl methyl silicon dichloride in the same manner as was the phenyl ethyl silicone in Example 1) was heated at about 100°–150° C. At the same time aqueous hydrochloric acid was added in small increments. Continued heating at about 170°–180° C. with continued addition of aqueous hydrochloric acid brought the material to a sticky, viscous state after a few hours in which state it was still soluble in toluene and was heat convertible. Further heating, at still higher temperatures, converted the silicone to a flexible, non-tacky resinous substance which was infusible and insoluble.

Example 6

A sample of tetrameric dimethyl silicone was refluxed with alcoholic hydrochloric acid for several hours. A high viscosity oil was produced having very little flow at room temperature.

Example 7

Liquid dimethyl silicone having a viscosity of 3.6 centistokes was mixed with 10 N hydrochloric acid and refluxed. The following table shows the viscosity at different times of reflux.

| Time of reflux: | Viscosity in centistokes |
|---|---|
| 0 | 3.6 |
| 8 hours | 6.0 |
| 15 hours | 49.0 |
| 22 hours | 75.7 |

The table clearly demonstrates the importance of continued heating in the presence of acid. It has been found generally true that not until the lower polymers have been heated for some time in the presence of acid does the viscosity begin to rise appreciably. However, once the viscosity does start to increase, then the rate accelerates rapidly.

Example 8

A mixture of ethyl silicon trichloride, phenyl ethyl silicon dichloride and diphenyl ethyl silicon monochloride in the molar ratio of 1–8–2 respectively was dissolved in ether and hydrolyzed by mixing with water. The ether solution of the resulting copolymer was washed free of hydrochloric acid, and the ether removed by distillation. The resulting ether free copolymer was then polmerized with .2% by weight of $H_2SO_4$ while blowing with steam. After 30 hours, the product was a resinous tacky material, soluble in toluene and having a viscosity in 50% solution of 420 centistokes at 25° C. Applied from a toluene solution to glass fibre tape it dried (after removal of solvent) in 3 hours of baking at 250° C. to a heat resistant, tack-free resin.

Example 9

A mixture of ethyl silicon trichloride, phenyl silicon trichloride, phenyl ethyl silicon dichloride, diphenyl silicon dichloride, diethyl silicon dichloride and diphenyl ethyl silicon monochloride (prepared by reaction of silicon tetrachloride, phenyl magnesium chloride and ethyl magnesium chloride in molar ratio of 1–1–1 at −20° C.) was dissolved in ether and hydrolyzed with water. The ether solution was washed free of acid and the ether removed by distillation. The resulting copolymer material was polymerized to a viscous, tacky material by heating at 220° C. with .2% by weight of $H_2SO_4$ while blowing with steam. The material was soluble in toluene and when applied from a toluene solution to glass fibre tape it dried (after removal of solvent) within a few hours of baking at 250° C. to a heat resistant tack-free resin.

In addition to the examples given above, dibutyl silicone, diethyl silicone, diamyl silicone and the hydrolysis products of methyl triethoxy silicane, ethyltriethoxysilicane, and amyltriethoxysilicane have been polymerized to high molecular weight polymers by my method. Besides these straight mono- and di-organo-substituted hydrolysis products, numerous copolymers containing on the average of from less than one up to but not including three radicals per silicon atom have been polymerized in accordance with this invention. These copolymers were prepared by the cohydrolysis and co-condensation of mixtures of differently substituted hydrolyzable silicanes obtained directly as mixtures from the Grignard reaction or prepared by mixing different silicanes of fair degree of purity to give mixtures of desired constituents in predetermined quantities. Among the silicanes employed to accomplish the latter was silicon tectrachloride, ethylorthosilicate, methyltriethoxysilicane, dimethyldiethoxysilicane, trimethylethoxysilicane, phenylmethyldiethoxysilicane, phenyldimethylethoxysilicane, phenyltriethoxysilicane, d i p h e n yldiethoxysilicane, ethyltriethoxysilicane, diethyl silicon dichloride, pheny ethyl silicon dichloride, butyltriethoxysilicane, dibutyldiethoxysilicane, benzyltriethoxysilicane, dibenzyldiethoxysilicane and others. Besides the catalysts designated in the examples, others were used including nitric acid, gaseous hydrogen chloride, hydrobromic acid, boric acid, oxalic acid and benzene sulphonic acid.

My invention is applicable to any organo-silicon oxide polymer having on the average less than three organic radicals attached to each silicon atom through carbon atoms. The unusual properties of these polymers are due primarily to the Si—O—Si groups present therein and to the organic radicals attached to the silicon atoms. The kind and number of organic radicals attached to silicon do not affect the fundamental behavior of the polymers, but only modify certain particular properties thereof. Besides the organic radicals already disclosed such radicals may be present as propyl, isopropyl, amyl, hexyl, heptyl to octadecyl and higher; alicyclic radicals such as cyclopentyl, cyclohexyl, etc.; aryl and alkaryl radicals such as mono- and poly-alkyl phenyls as tolyl, xylyl, mesityl, mono-, di-, and tri-ethyl phenyls, mono-, di-, and tri-propyl phenyls, etc.; naphthyl, mono- and poly-alkyl naphthyls as methyl naphthyl, diethyl naphthyls, tri-propyl naphthyl, etc.; tetrahydronaphthyl, anthracyl, etc.; aralkyl such as benzyl, phenylethyl, etc.; alkenyl such as methallyl, allyl, etc.

The new polymers may be used for various purposes. For example, as already mentioned, they are excellent coating and impregnating agents, particularly in the fabrication of electrical insulating materials, because in their intermediate form they can be dissolved and applied in the form of solutions for the impregnation of various fibrous materials and thereafter can be polymerized to complete insolubility and infusibility. In the latter state they have good mechanical characteristics and good electrical properties at room temperature, all of which are retained at temperatures above those at which prior coating materials break down and deteriorate. The new polymers are relatively non-flammable and are likewise superior to prior coatings in that under extreme conditions of temperature, etc. there is little tendency to carbonize.

In making use of the new polymers for impregnating tapes and other fibrous materials for electrical insulation the polymerization is carried out until the material has attained the sticky, viscous heat-convertible state just short of insolubility. Then, if desired, the acid may be removed by neutralization with alkali such as sodium hydroxide or calcium hydroxide. The alkali, when added in excess, also serves to remove impurities that may be present such as iron, etc. The neutralized product is dissolved in toluene or other suitable solvent. The solution is applied by dipping, brushing or spraying, followed by evaporation of the solvent. Several applications of the solution may be required to produce a coating of sufficient thickness. When the solvent has completely evaporated, the coated article is baked for several hours at a temperature preferably between 200 and 300° C. until the viscous polymeric mixture is converted to a tack-free coating. With the phenyl ethyl silicone polymer, this condition is attained by baking for about 36 hours while the temperature is slowly raised from about 200° C. to about 260° C. Other organo-silicon polymers within the scope of my invention may require different temperatures and times, but such conditions are readily determined by trial.

In addition to the use of the new polymers in the field of electrical insulation, there are many others for which these polymers at various stages of polymerization are eminently adapted. They may be used as hydraulic fluids, liquid insulating media, thermal expansion fluids, waterproofing agents, etc. Their resistance to high temperature, their electrical insulating properties, low freezing points and low vapor pressure adapt them to many diversified industrial applications.

I claim:

The method of increasing the average molecular weight of a completely dehydrated liquid polymeric dimethyl silicone which comprises adding hydrochloric acid to said silicone and refluxing the resulting mixture of said silicone and hydrochloric acid until an increase in viscosity of said silicone is effected.

JAMES FRANKLIN HYDE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,220 | Rochow | Oct. 7, 1941 |
| 2,371,068 | Rochow | Mar. 6, 1945 |
| 2,435,147 | McGregor & Warrick | Mar. 2, 1948 |
| 2,437,204 | McGregor & Warrick | Mar. 2, 1948 |
| 2,456,496 | Ford et al. | Dec. 14, 1948 |

FOREIGN PATENTS

| Number | Country | Date |
|---|---|---|
| 113,708 | Australia | Sept. 4, 1941 |
| 549,081 | Great Britain | Nov. 5, 1942 |

OTHER REFERENCES

Glasstone, Text Book of Physical Chemistry, Van Nostrand, 1940 pp. 889, 891, 892 and 958.

Kipping, Trans. Chem. Soc. J. (London) vol. 101, 1921, pages 2125, 2129 to 2131 and 2141.

Kipping et al., J. Chem. Soc. (London) vol. 105, 1914, pages 484, 487 to 490, 492, 494, 495, 498.

Robison et al., J. Chem. Soc. (London) vol. 105, 1941, pages 40, 45, 46.

Meads et al., J. Chem. Soc. (London), vol. 105, 1914, pages 679 and 687.

Koton, J. Applied Chem. U. S. S. R. vol. 12, 1435–9 (1949), Chem. Abstr. vol. 34, pages 6242-3 (1940).

Hyde, J. Amer. Chem. Soc. vol. 63, May 1941, pp. 1194 to 1196.

Cusa, J. Chem. Soc. (London) 1932 pp. 2205-9 Chem. Abstr. vol 26, pp. 5938-9.

Beilsteins Handbuch der Organ. Chem. vol. 4, 4th ed. 1933, page 629 (top).